United States Patent [19]

Sullivan

[11] B  4,001,467
[45] Jan. 4, 1977

[54] METHOD FOR PRODUCING ZINC ANODE

[75] Inventor: Charles I. Sullivan, Melrose, Mass.

[73] Assignee: Polaroid Corporation, Cambridge, Mass.

[22] Filed: Feb. 24, 1975

[21] Appl. No.: 552,709

[44] Published under the second Trial Voluntary Protest Program on March 23, 1976 as document No. B 552,709.

Related U.S. Application Data

[60] Division of Ser. No. 408,925, Oct. 23, 1973, Continuation-in-part of Ser. No. 199,216, Nov. 16, 1971, abandoned.

[52] U.S. Cl. .............................. 427/123; 429/229; 260/42.22
[51] Int. Cl.² ......................................... H01M 13/06
[58] Field of Search ............ 136/127, 125, 126, 30, 136/31, 75, 120 R; 260/42.22, 29.6 ME; 427/123

[56] References Cited

UNITED STATES PATENTS

| | | | |
|---|---|---|---|
| 2,738,375 | 3/1956 | Schlotter | 136/30 |
| 2,828,351 | 3/1958 | Rade | 136/126 |
| 2,838,590 | 6/1958 | Garine | 136/30 |
| 3,563,805 | 2/1971 | Deierhol, Jr. | 136/111 |
| 3,607,430 | 9/1971 | Glover | 136/111 |

Primary Examiner—Ralph S. Kendall
Attorney, Agent, or Firm—Philip G. Kiely

[57] ABSTRACT

A flat zinc anode useful in cells and batteries, e.g., Leclanche batteries, is produced by coating an electrically conductive substrate with a slurry of zinc dust and an aqueous polymer latex in which the polymer particles have been swollen by an alcohol. The amount of the polymer is about 0.5 to 5 weight percent based on the amount of zinc. The amount of polymeric binder is not sufficient to form a continuous film but rather forms an adhesive mass which holds the zinc dust particles in place. Many polymers are suitable for use as binders, and it is presently preferred to employ, e.g., soft vinyl polymers, acrylates, or elastomers which do not react with zinc to impair battery performance or stability of the mix.

4 Claims, 5 Drawing Figures

METHOD FOR PRODUCING ZINC ANODE

CROSS REFERENCE TO OTHER APPLICATION

This application is a division of application Ser. No. 408,925 filed Oct. 23, 1973 which in turn is a continuation-in-part of application Ser. No. 199,216, filed Nov. 16, 1971 now abandoned.

BACKGROUND OF THE INVENTION

The present invention relates to thin, flat zinc anodes for galvanic cells and batteries and to batteries employing such anodes. More particularly, the present invention relates to thin, flat anodes produced from zinc dust and a small amount of polymeric binder.

In recent years there has been increasing demand for reliable, compact batteries, particularly for use in portable electrically operated devices such as tape recorders, radios, cameras, etc. Historically, most batteries produced for use in such devices have been cylindrical and this has to some extent limited the size and shape of the devices in which they are used. In modern design concepts, there is increased emphasis placed upon devices having thin, flat shapes which do not satisfactorily accommodate the conventional cylindrical batteries. This emphasis upon thin, flat cells and batteries has, of course, imposed corresponding restrictions upon the size of the anodes and other cell elements. In general, zinc anodes have either been cast or fabricated from sheet metal. It has also been proposed to produce zinc anodes from powdered zinc mixed with binder resin and compressed at elevated temperatures and high pressure. Casting and high temperature and pressure compression techniques are undesirable to produce very thin, flat zinc anodes. While sheet metal anodes have met with a degree of success in such uses, they are not fully satisfactory particularly when very thin anodes are desired. Attempts to employ a polymeric latex as a vehicle for zinc particles was also unsatisfactory since the mixture of the latex and the zinc particles lacks stability resulting in separation or agglomeration to a degree that renders the mix unusable.

SUMMARY OF THE INVENTION

It is a primary object of the present invention to provide a novel composition useful in the production of thin, flat zinc anodes. Another primary object of the invention is to provide a novel procedure for the production of thin, flat zinc anodes.

The objects of the invention are accomplished by utilizing a composition comprising finely divided zinc dust and about 0.5 to 5 weight per cent of a polymeric binder as defined hereinafter and which polymer is in the form of an aqueous latex of swollen polymer particles. This composition is utilized to produce thin anodes by application onto an electrically conductive substrate by a procedure such as silk screening, gravure printing, roll coating, or the like. The coating is then dried to remove the water and leave a substantially uniform layer of about 1.5 mils thickness with the zinc particles firmly adhered together by polymer particles. The amount of polymer is not sufficient to form a continuous film but rather a sticky discontinuous mass of swollen polymer particles which are characterized by chemists as "jelly fish" is provided which, in effect, when dry, glues the zinc particles together, i.e., "spot" welding the zinc particles to form a stable mass.

A large number of diverse polymers may be utilized as binders in carrying out the invention. There may be employed a polymer system whose particles may be swollen by a solvent which is miscible with water, and which polymer system does not cross-link or otherwise react with the zinc dust to a degree which would hinder the electrochemical reactions, or interfere with the battery reactions. Vinyl polymers, acrylates, and elastomers have been suitably employed. The polymer particles may be swollen by known solvents for the polymers provided that the solvent is miscible with water so as not to interfere with the maintenance of the latex.

The substrate upon which the composition is coated is preferably an electrically conductive vinyl film, for example, a vinyl film, sold under the trademark "Condulon" which is available in very thin sheets. When a battery is to be formed in a series of stacked cells, a so-called "duplex" electrode may be produced by coating the zinc containing composition onto one surface of the substrate and by forming the cathode collector for the adjacent cell on the other side of the substrate.

DETAILED DESCRIPTION OF THE INVENTION

Figure 1:
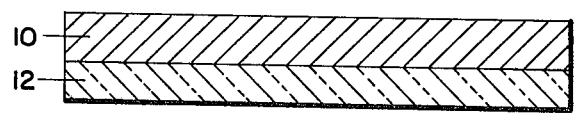
FIG. 1 is a vertical cross sectional view of an anode produced according to the invention.

Referring now to the drawings, FIG. 1 illustrates a zinc anode comprised of a layer 10 consisting mainly of divided zinc dust with the zinc particles adhered together with a small amount of a binder polymer as defined hereinafter and a substrate 12 consisting of electrically conductive film, for example, an electrically conductive vinyl film known as "Condulon" which is available in thin sheets such as 0.002 inches in thickness.

The zinc layer 10 is produced from a composition comprising finely divided zinc dust, about 0.5 to 5 weight percent and preferably about 2.0 to 3.0 weight percent solids content based on the weight of the zinc of a latex of swollen polymeric binder particles. The amount of polymer required is also determined by the particle size of the zinc. The amount of solids employed is not critical and results in the composition being in the form of a slurry containing from about 50 to 90 percent or more solids.

The slurry composition is applied to the substrate 12 by any suitable conventional process such as silk screening, gravure printing, roll coating, and the like, in order to obtain a thin zinc coating upon drying of the deposited slurry. The viscosity of the slurry system can be readily adjusted depending upon the particular coating process employed. The quantity of water utilized, of course, influences the drying time, and the amount of water employed will normally be selected to permit a suitable viscosity for coating and drying of the deposited slurry at a rate to permit a relatively rapid battery manufacturing process. It has been found that employing the small amount of the binder polymer specified above, that the layer 10 does not have the characteristics of a continuous film which would be undesirable but rather the polymer particles sometimes referred to as "jelly fish" form a sticky mass of particles which, when dry, hold the zinc dust particles in place without constituting a physical barrier which would interfere with the subsequent chemical reaction in the battery.

Many diverse polymers are useful as the binder polymers of the invention. In fact, it is presently believed that all polymer latexes which may be swollen by a solvent which is miscible in water may be employed in the invention. Of course, the polymer selected must be nonreactive in the battery environment and particularly must not react with the zinc or otherwise interfere with the proper function of the battery.

Particularly preferred are polymers which have a surfactant present as a polymerized monomer such as 2-sulfoethyl methacrylate or 2-acrylamido-2-propane sulfonic acid. Thus, the emulsifier is bound to the polymer itself and cannot be desorbed from the polymer particles onto other surfaces. This greatly enhances the stability of the zinc polymer mix.

Included among the useful polymers are vinyl polymers such as vinyl chloride polymers, polyvinyl acetate, and copolymers with copolymerizable monomers such as olefins, e.g., ethylenevinyl acetate copolymer; acrylic polymers including acrylates and methacrylates, i.e., polymers of esters of acrylic acid or methacrylic acid with alcohols such as n-butanol, n-pentanol, isopentanol, 2-methyl pentanol, n-octanol, alone or copolymerized with ethylenically unsaturated monomers such as acrylic acid, methacrylic acid, acrylamide, methacrylamide, vinyl acetate, glycol diacrylates, or mixtures of these, e.g., a copolymer of ethyl acrylate and 2-sulfoethyl acrylate; and various copolymers including ethyl acrylate-vinyl pyrrolidone copolymers. As stated above, a preferred polymer is a copolymer of ethyl acrylate and 2-sulfoethyl methacrylate. A particularly preferred aspect of the ethyl acrylate/2-sulfoethyl acrylate copolymer is that no dispersing agent is necessary for combining the polymer with the zinc dust and acts as its own dispersing agent as well.

Preferably soft polymers are employed in the invention. Conventional stabilizers, tackifiers and other known additives may be added to the polymers.

The polymers utilized may be cross-linkable, if desired, either by adding cross-linking agents or by making the polymer system self curing by including appropriate monomer units, for example, by combining into acrylic polymers a glycidyl ester such as glycidyl acrylate.

The selection of an appropriate swelling agent for a given polymer latex depends upon two factors, namely, the swelling agent must be a solvent for the particular polymer latex to be swollen, and the swelling agent must also be miscible with water. In general, the polymers of the invention may be dissolved by common organic solvents. Those of ordinary skill in the art are also aware of or can readily ascertain whether such solvents are miscible with water, and in this fashion can arrive at a suitable swelling agent for a given polymer latex. By way of example only, suitable swelling agents include lower alcohols such as ethanol, n-propanol, isopropanol and t-butanol; and ketones such as acetone and methylethyl ketone. N-propanol is preferred because the evaporation rate is substantially the same as water.

In swelling the polymer particles of the latex, the solvent or swelling agent may be added to the latex or vice versa. A simple mixing technique is employed. When the swelling agent is added to the latex, the resulting system looks like a solution, but studies have indicated that the particles can be recovered, indicating that swelling of these particles rather than complete solution has occurred. With solvents which evaporate before the water, the particles will tend to assume the original latex configuration again unless broken up excessively when in the swollen state. The swollen particles are more stable and suspend better than the original latex. The stability of the swollen system with the zinc is believed to be derived from the particularly soluble state of the polymer particles and from a retained zeta potential with polymerized emulsifier, but it is not intended to be bound in any way by this theory. The swollen particles are essentially more stable than the original latex. Since the polymer is not in the form of a true solution, the zinc particles will not be coated as much with polymer but rather adhered together by the particles.

The utilization of the swelling agent to swell the particles before addition of the zinc is important for the present invention. Using an unswollen polymer latex, the zinc will not uniformly mix with the latex system but rather balls up and agglomerates to a point where the slurry mixture is unsuitable for use in a battery. However, the use of a swollen latex systems results in a stable suspension of the zinc in the zinc-polymer latex system.

Figure 3:
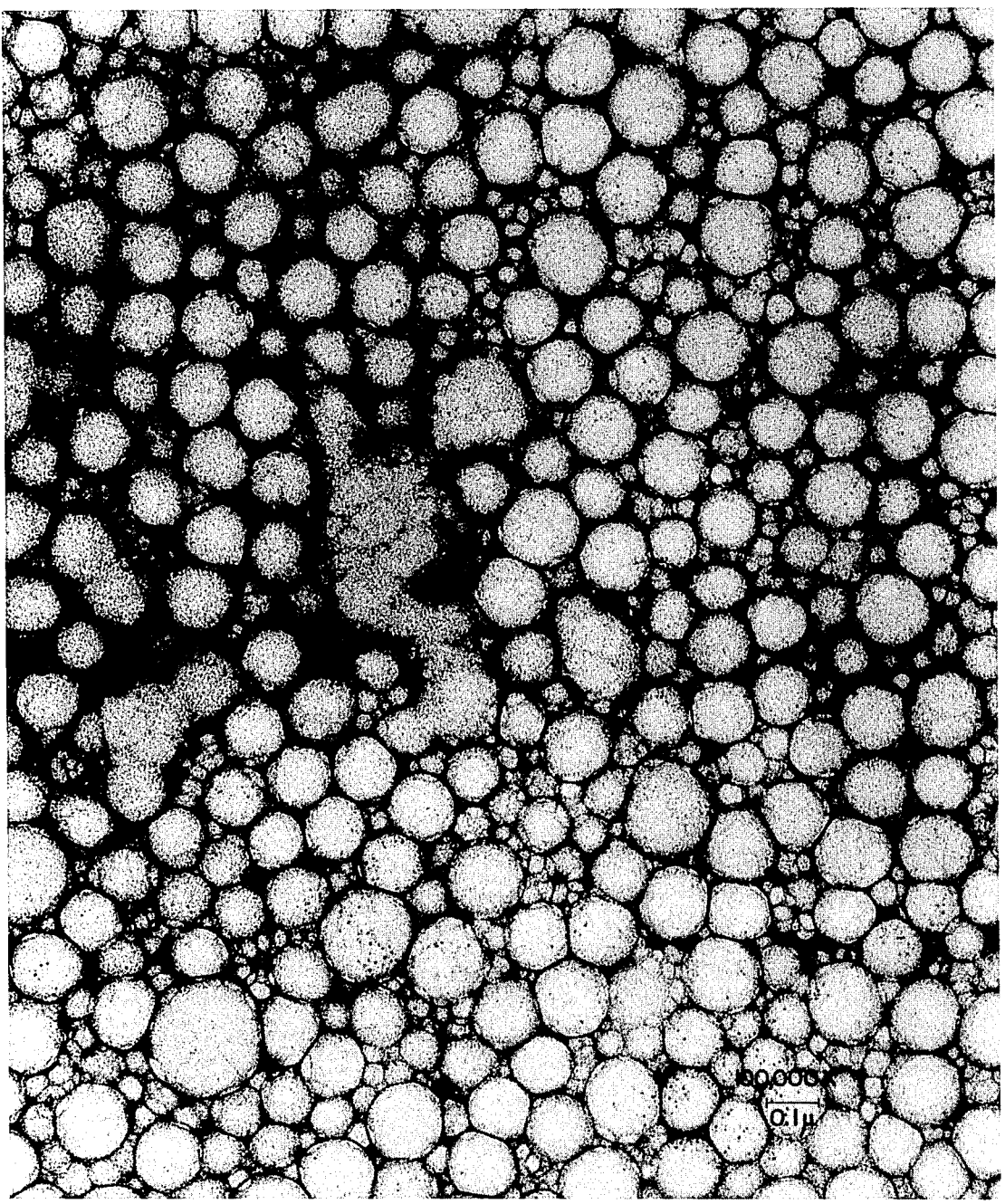
FIG. 3 is an electron photomicrograph at a magnification of 100,000 times of a dried aqueous latex of a 92:8 ethyl acrylate/2-sulfoethyl methacrylate copolymer diluted to 1% solids with water.
Figure 4:
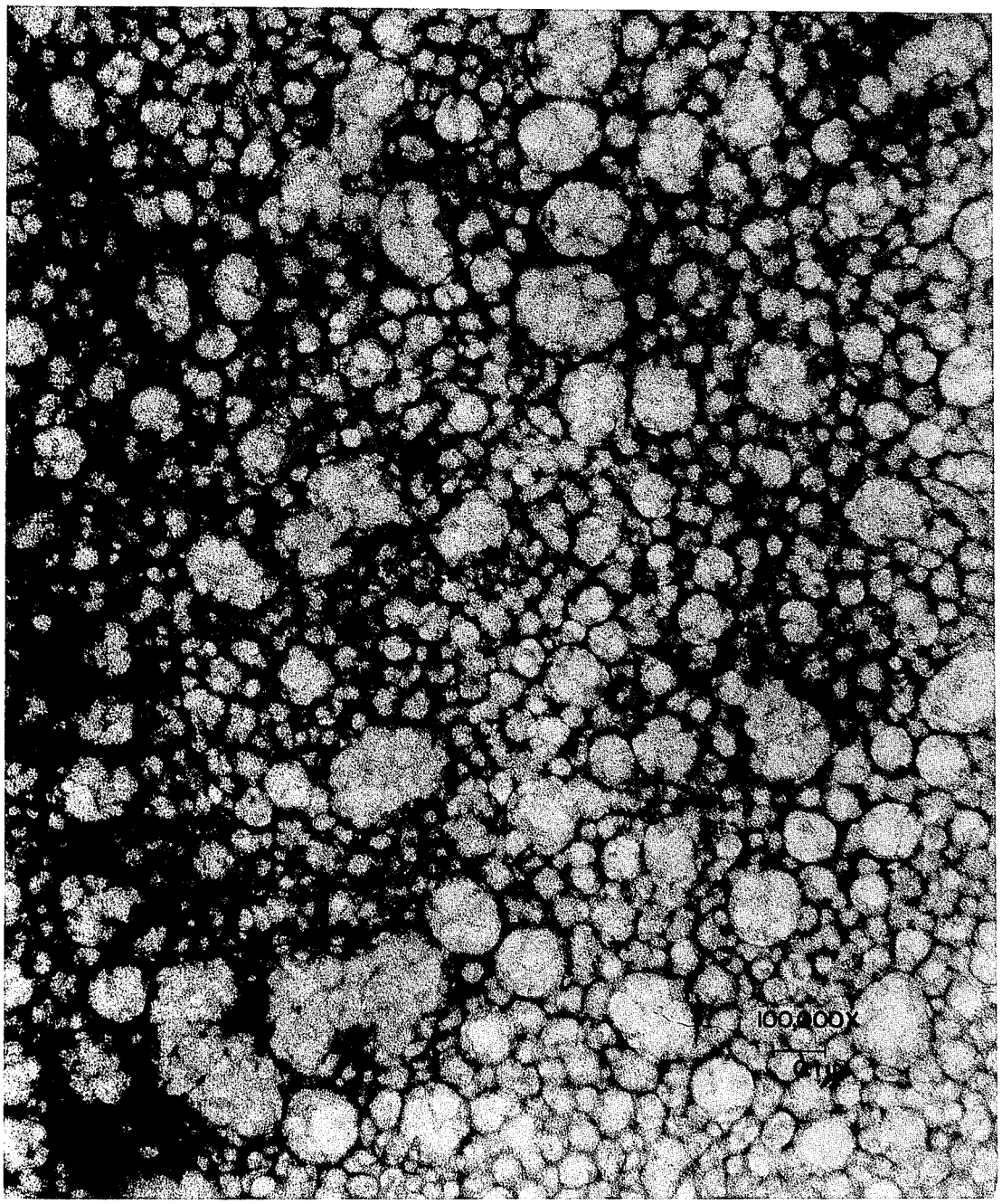
FIG. 4 is an electron photomicrograph at a magnification of 100,000 times of a dried ethyl acrylate/2-sulfoethyl methacrylate copolymer latex (6% polymer in 85% isopropanol and 15% water) then further diluted to 1% polymer with isopropanol.
Figure 5:
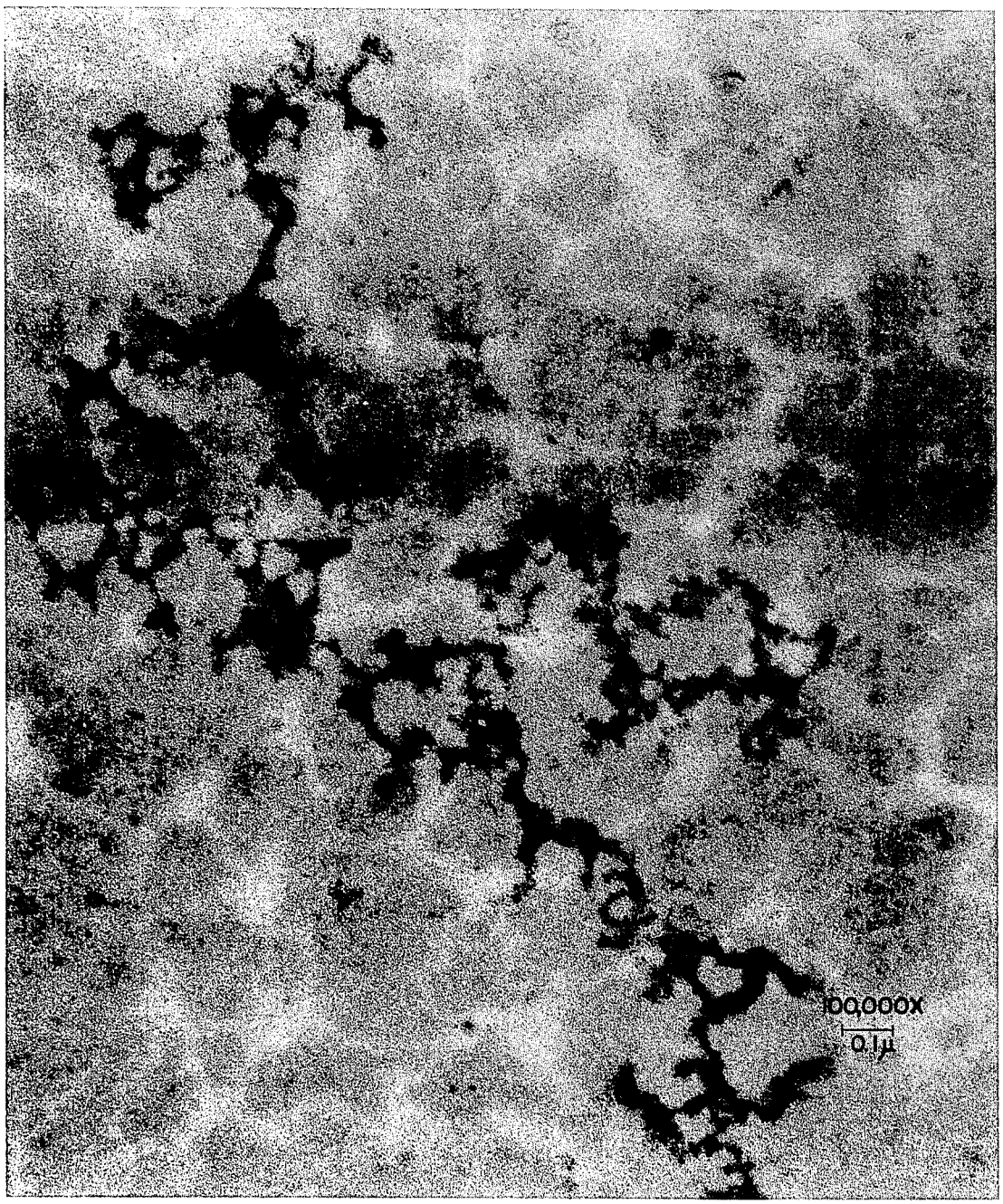
FIG. 5 is an electron photomicrograph of a high molecular weight polyacrylamide latex (2 ½% polymer in water) diluted to 1% in water.

FIG. 3 is an electron photomicrograph of 100,000 time magnification of dried latex polymer particles suitable for use in the present invention. The latex from which the particles was obtained was milky in appearance. The polymer particles are clearly ascertainable. FIG. 4 is the same polymer of FIG. 3 but which has been swollen with isopropanol prior to deposition and drying. Although the swollen, liquid polymer appears clear, like a solution, to the naked eye, the photomicrograph shows the existence of particles cast from the liquid which have been broken up somewhat while in the swollen state. However, they are particles and are larger than individual molecules. FIG. 5 is an electron photomicrograph of a film cast from high molecular weight ($\sim$ 5,000,000) polyacrylamide in water. No particles are visible, indicating the film was cast from a true solution.

A small amount of carbon black may be incorporated into the anode composition. The carbon black will function to fill voids between the zinc particles and thus improve packing density; however, addition of the carbon black may require somewhat more binder polymer be added to the composition.

Thickeners, for example, Methocel, fumed silica, asbestos, ethylene glycol, and the like, may be employed to further slow the settling of the zinc dust and thus permit relatively long storage stability before coating. Surfactants may also be employed. Such additives are not essential to the present invention.

Figure 2:
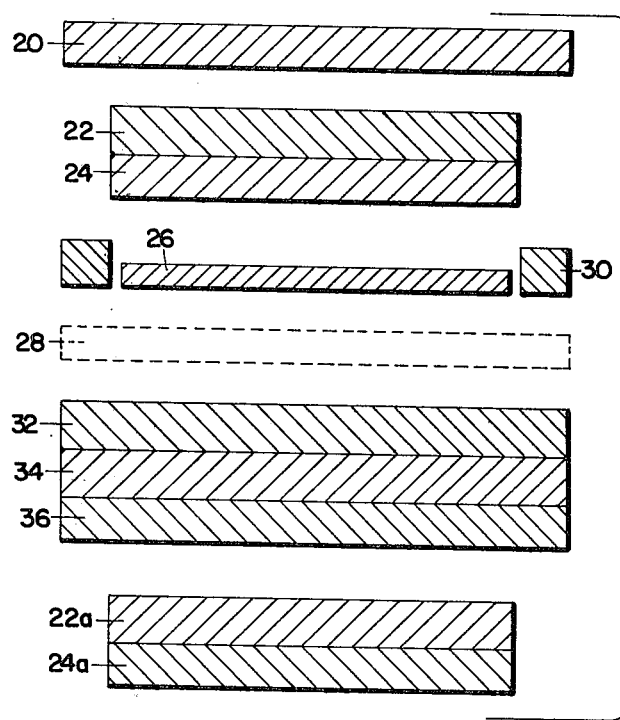
FIG. 2 is a fragmentary exploded view of a portion of a battery showing a duplex electrode prepared using the composition of the present invention.

FIG. 2 illustrates the application of the present invention to the construction of a flat battery employing duplex electrodes in which one surface of the metal anode is provided with a coating of conductive carbonaceous material to form the cathode collector of the superposed cell.

In the fragmentary exploded section of the battery illustrated in FIG. 2, there is illustrated an upper terminal connector 20 which may be made of tin coated steel sheet, a cathode comprised of a substrate 22 of electrically conductive vinyl film upon which is deposited a conventional cathodic mix comprising, for example, finely divided manganese dioxide, finely divided carbonaceous material to improve conductivity, and a small amount of binder. An electrolyte layer 26 comprised of a known electrolyte such as an immobilized aqueous solution of ammonium chloride and zinc chloride in conventional proportions is disposed beneath the cathode and above a conventional separator 28 which may be a sheet of porous paper. Reference numeral 30 designates a rectangular marginal frame comprised of a hot melt or other suitable adhesive, preferably a vinyl adhesive, which is disposed marginally around the cathode and electrolyte in the assembled cells.

Beneath the separator 28 there is a duplex electrode comprised of an upper zinc dust and binder polymer layer 32 constituting an anode and corresponding to the layer 10 of the FIG. 1 embodiment. This layer is coated onto a substrate 34 of an electrically conductive vinyl film corresponding to the layer 12 of the FIG. 1 embodiment. The underside of the substrate 34 is coated with a layer 36 of conductive carbonaceous material which serves as the cathode collector for the next cell, which cell includes a cathode comprised of electrically conductive substrate 22a and a layer 24a of cathodic mix. In this fashion, a stack of cells is connected in series relationship. The number of superimposed cells in the battery is a matter of choice depending upon the desired battery capacity.

Although not illustrated, the various above-described components would normally be secured to each other by intervening adhesive layers.

For further details of suitable electrolyte compositions, cathodic mix compositions, and adhesive compositions, which may be employed in batteries utilizing the present invention, reference may be had, for example, to U.S. Pat. No. 3,563,805 of Deierhoi, Jr., which is a representative patent relating to thin, flat cells and batteries within which zinc anodes of the present invention may be utilized.

EXAMPLE I

A zinc anode composition containing 99 weight percent zinc and 1 percent polymer binder based on the zinc was prepared by forming an aqueous latex of 1.82 grams of a vinyl acetate-ethylene copolymer (Aircoflex) containing 55 weight percent solids and the remainder isopropanol as a swelling agent, and 20 grams of distilled water. To the resulting mixture, 99 grams of zinc dust (New Jersey Zinc No. 44) were slowly added while stirring. The blended slurry was then coated onto an electrically conductive vinyl film (Condulon) after preferably priming the film with a silane adhesion promoter (Union Carbide A-187). After drying, the product was ready for use as an anode in a cell.

EXAMPLE II

Employing the general procedure outlined in Example I, generally equivalent results were obtained by using as binders 3% of an ethyl acrylate/2-sulfoethyl methacrylate copolymer in the weight ratio of 92:8, and 97% zinc dust (78 $\mu$).

The above-indicated anodes were used to prepare Leclanche cells and were found to function satisfactorily in such a system.

It has also been found that the novel swollen latex can also be suitably employed as the carrier material for the cathode components, e.g., in the case of a Leclanche cell, the manganese hydroxide and carbon black.

While presently preferred embodiments of the invention have been shown and described with particularity, it will be appreciated that various changes and modifications may suggest themselves to those of ordinary skill in the art upon being apprised of the present disclosure. It is intended to encompass all such changes and modifications as fall within the scope and spirit of the appended claims.

What is claimed is:

1. A method for producing an anode assembly which comprises the steps of swelling an aqueous polymer latex with a solvent miscible with water, mixing the swollen latex polymer particles with zinc dust, coating an electrically conductive resin substrate with the thus-formed suspension of zinc dust in an aqueous latex of swollen particles of a binder polymer, the amount of the binder polymer being about 0.5 to 5 weight percent based on the weight of the zinc, and drying the coating to form an adherent zinc coating on the substrate.

2. A method as defined in claim 1 wherein the polymer is a soft polymer selected from the group consisting of vinyl polymers, acrylates and elastomers.

3. A method as defined in claim 2 wherein said polymer is a copolymer of ethyl acrylate and 2-sulfo ethyl methacrylate.

4. A method as defined in claim 1 wherein said suspension contains about 50 to 90 weight percent of solids.

5. A method according to claim 1 which includes the addition of a thickening agent to said latex subsequent to addition of the swelling agent but prior to coating said substrate.

* * * * *